United States Patent [19]

Yamada et al.

[11] Patent Number: 4,518,173
[45] Date of Patent: May 21, 1985

[54] RING JOINT FOR SEATBELT SYSTEM

[75] Inventors: Makoto Yamada, Toyota; Tatsushi Kubota, Okazaki; Ikuzo Kojima, Nagoya, all of Japan

[73] Assignees: Toyota Jidosha Kabushiki Kaisha; Kabushiki Kaisha Takai-Pika-Denki-Seisakusho, both of Tokyo, Japan

[21] Appl. No.: 398,566

[22] Filed: Jul. 15, 1982

[30] Foreign Application Priority Data

Jul. 31, 1981 [JP] Japan ............................ 56-115219[U]

[51] Int. Cl.³ .............................................. B60R 21/10
[52] U.S. Cl. ..................................... 280/806; 24/615; 24/639; 24/642; 280/808; 297/480; D2/380
[58] Field of Search ................................. 280/801–808; 242/104.2; 297/483, 479, 480, 468; D2/405, 380; 24/230 R, 230 AP, 230 AS, 230 AT, 230 TC, 230 A, 639, 615, 642

[56] References Cited

U.S. PATENT DOCUMENTS

| 4,310,177 | 1/1982 | Roger, Jr. et al. | 280/802 |
| 4,364,584 | 12/1982 | Rogers, Jr. et al. | 280/802 |
| 4,386,793 | 6/1983 | Katsuno et al. | 280/802 |
| 4,398,680 | 8/1983 | Ogawa et al. | 280/806 X |
| 4,420,172 | 12/1983 | Kojima | 280/802 |

Primary Examiner—Joseph F. Peters, Jr.
Assistant Examiner—Mitchell J. Hill
Attorney, Agent, or Firm—Parkhurst & Oliff

[57] ABSTRACT

A ring joint for connecting the intermediate portion of an outer webbing to the forward end portion of an inner webbing to fasten the webbings about an occupant in a three-point type seatbelt system, wherein stoppers erected from a joint base prevents the axial movement of a lock bar, whereby, in an emergency situation of a vehicle, the lock bar locks the intermediate portion of the outer webbing between the joint base and itself to prevent the outer webbing from moving in the longitudinal direction thereof, so that an occupant can be reliably restrained.

12 Claims, 5 Drawing Figures

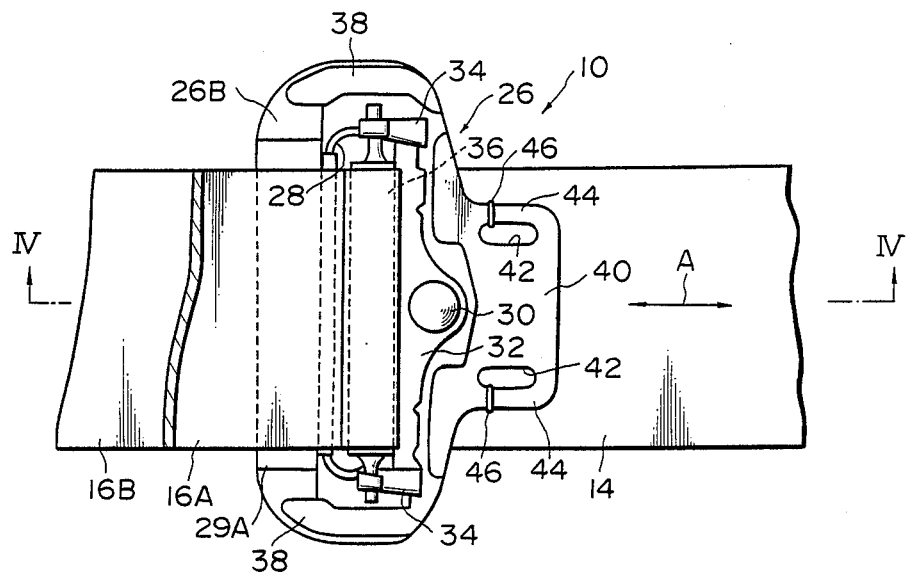
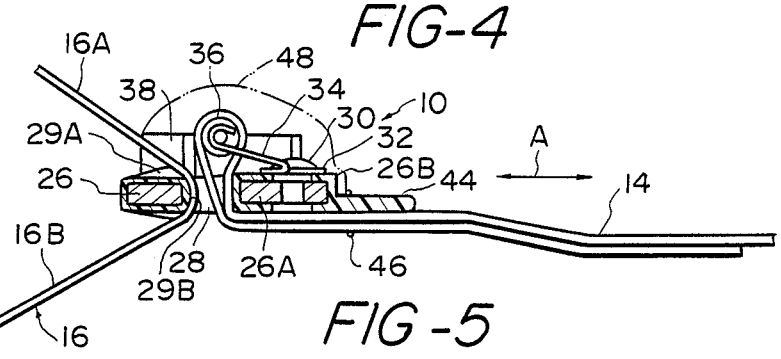
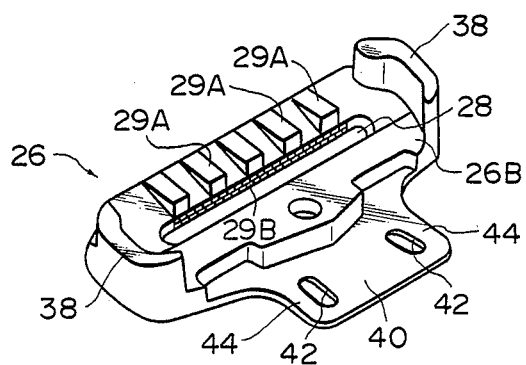

RING JOINT FOR SEATBELT SYSTEM

BACKGROUND OF THE INVENTION

1. Field of the Invention

This invention relates to a ring joint for a seatbelt system used in a seatbelt system for protecting an occupant in an emergency situation of a vehicle, for connecting an inner webbing to an outer webbing.

2. Description of the Prior Art

A ring joint has been used in a seatbelt system having an outer webbing and an inner webbing, and is of such an arrangement that a joint base is secured to the forward end portion of the inner webbing through a lock member and the intermediate portion of the outer webbing is wound round this joint base and turned back thereat.

This lock member is separated from a contact portion of the outer webbing in the normal running condition of a vehicle, and consequently, when the webbings are fastened about an occupant, the lap restraining portion and the shoulder restraining portion of the outer webbing are accomodated in length with each other, so that the webbings can be suitably fastened about the occupant at all times even if any occupant being different in physical build from one another enters the vehicle, or the occupant changes his driving posture. Furthermore, in an emergency situation of the vehicle, such as a collision, the lock member locks the contact portion of the outer webbing between the ring joint and itself due to a tension of the inner webbing, whereby the lengths of the lap restraining portion and the shoulder restraining portion of the outer webbing are made definite, so that the occupant can be suitably restrained.

However, with the ring joint of the type described, when an unbalanced load acts thereon in an emergency situation of the vehicle, the ring joint rotates about a longitudinal axis of one of the webbings, whereby a load in the widthwise direction of the webbing is generated between the ring joint and the webbing, so that the inner webbing moves the lock member in the widthwise direction of the webbing, thus possibly causing the lock member to fall off the joint base.

SUMMARY OF THE INVENTION

The present invention has been developed to obviate the above-described disadvantages of the prior art and has as its object the provision of a ring joint for a seatbelt system, in which, even if an unbalaced load acts thereon, a possibility of fall-off of a lock member from a joint base is eliminated.

The ring joint for a seatbelt system according to the present invention is provided on a joint base thereof with stoppers for restricting the movement of the lock member in the widthwise direction of the webbing, so that the lock member can be prevented from falling off.

Description will hereunder be given of an embodiment of the present invention with reference to the drawings.

BRIEF DESCRIPTION OF THE DRAWINGS

FIG. 3 is a front view showing the ring joint;

FIG. 4 is a sectional view taken along the line IV—IV in FIG. 3; and

FIG. 5 is a perspective view showing the joint base.

DESCRIPTION OF THE PREFERRED EMBODIMENT OF THE INVENTION

Figure 1:
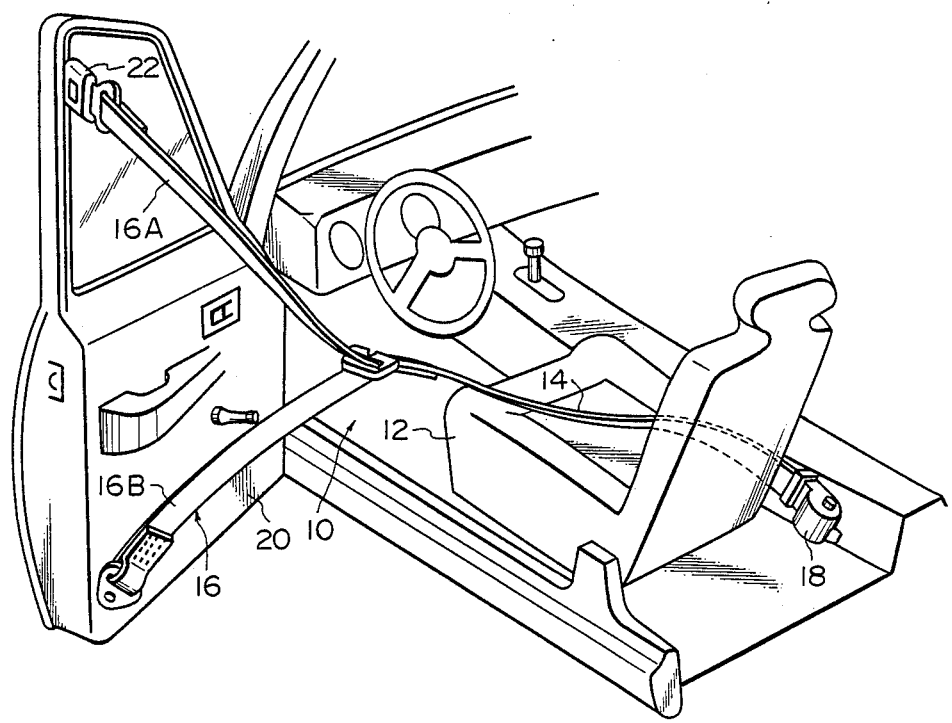
FIG. 1 is a perspective view of a door-opened state, showing a seatbelt system to which is applied the ring joint for a seatbelt system according to the present invention.
Figure 2:
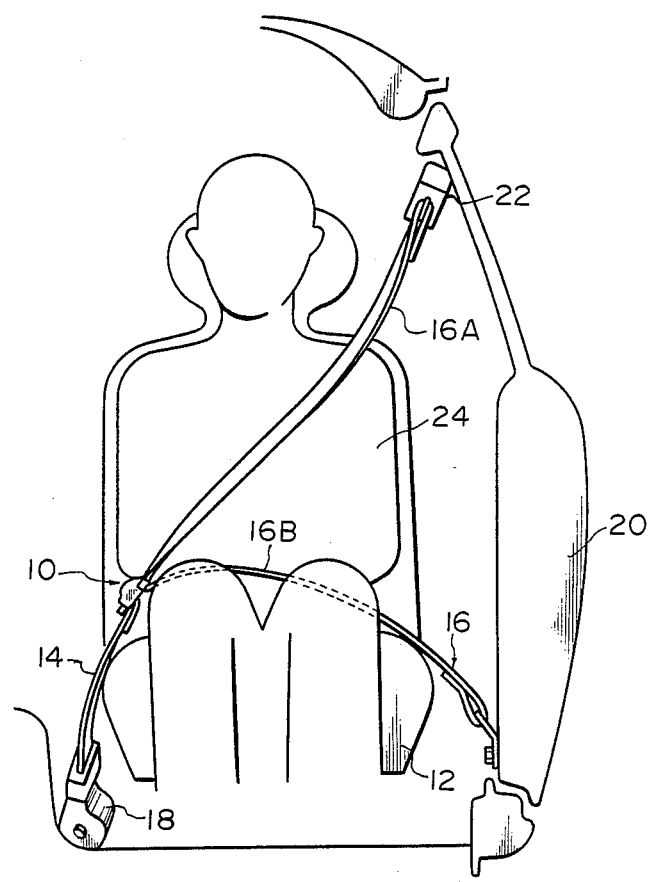
FIG. 2 is a sectional view looking the vehicle in a door-closed state from forward.

FIGS. 1 and 2 show a seatbelt system applied thereto with a ring joint 10 according to the present invention, in which an occupant 24 seated at a seat 12 can be fastened thereabout with an inner webbing 14 and an outer webbing 16.

The inner webbing 14 is wound into a retractor 18 mounted in the substantially central portion of a vehicle, and secured at the forward end portion thereof with a ring joint 10. This retractor 18 is adapted to wind the inner webbing 14 by a biasing force thereof, and incorporates therein an inertia lock mechanism for instantaneously stopping the unwinding of the inner webbing 14 in an emergency situation of the vehicle.

The outer webbing 16 is secured at one end thereof to the lower rear end portion of a door 20, at the other end thereof to the upper rear end portion of the door 20 through a buckle device 22, and the intermediate portion thereof is turned back at the ring joint 10. Here, one portion of the outer webbing 16, which has been turned back at the ring joint 10, functions as a shoulder restraining portion 16A, and the other portion as a lap restraining portion 16B.

In consequence, when the door 20 is opened as shown in FIG. 1, the outer webbing 16 is moved forwardly in the vehicle by a circularly arcuate door opening motion, a space for allowing the occupant 24 to enter the vehicle is formed between the webbings 14, 16 and a seat 12, and, when the occupant 24 closes the door 20 upon being seated at the seat 12, the outer webbing 16 is conversely moved rearwardly in the vehicle by a circularly arcuate door closing motion, so that the webbings can be fastened about the occupant 24.

Detailed description will now be given of the ring joint 10 with reference to FIGS. 3 and 4.

The joint base 26 is constructed such that a synthetic resin layer 26B is coated on the outer surface of a steel base material 26A punched out into a loop shape, and consequently, is formed at the central portion thereof with a slot 28.

The intermediate portion of the outer webbing 16 is inserted through and turned back at this slot 28, whereby the outer webbing 16 is wound round one of long side pieces of the joint base 26.

A plurality of projections 29A are formed on a contact portion of the long side piece, around which is wound the outer webbing 16, at regular intervals as detailedly shown in FIG. 5, and further, a plurality of small projections 29B are formed at positions close to the aforesaid projections 29A. These projections 29A and 29B are adapted to increase a frictional force generated between a contact portion of the outer webbing 16 and the joint base 26 in a locked state of the outer webbing 16.

A sheet spring 32 is solidly secured to the other of long side pieces of the joint base 26 through a rivet 30. A pair of arms or resilient members 34 are extended from opposite end portions of this sheet spring 32, and opposite end portions of a lock bar 36, or a lock member are supported by the forward end portions of these arms 34. The inner webbing 14, which has passed through the slot 28 from the side opposite to the lock bar 36, is wound round and turned back at this lock bar 36, the forward end portion of the inner webbing 14 thus turned back passes through the slot 28 again and is sewn onto the intermediate portion of the inner webbing 14. In consequence, the inner webbing 14 is formed with a loop portion, through which is inserted the lock bar 36. Preferably, the longitudinal axis of the lock bar 36 is arranged in the widthwise direction of the webbing.

Here, under the normal condition, the sheet spring 32 holds the lock bar 36 and a contact portion of the inner webbing 14 wound around the lock bar 36 in a state of being separated from the slot 28 and a portion of the outer webbing 16 wound around the slot 28. However, if a relative load acts (in directions indicated by an arrow A) between the inner webbing 14 and the joint base 26, then the sheet spring 32 is flexed to bring the lock bar 36 into pressing contact with inner face of the slot 28, whereby the intermediate portion of the outer webbing 16 is clampingly locked between the inner webbing wound around the lock bar 36 and the joint base 26, so that the outer webbing 16 can be prevented from moving in the longitudinal direction thereof.

A pair of stoppers or wall members 38 project from opposite side portions of the joint base 26. Each of the wall members 38 is opposed to each of the longitudinal end portions of the lock bar 36 and a certain distance separates each wall member from the corresponding end portion. The end walls 28 are adapted to restrict the movement of the lock bar 36 in the widthwise direction of the webbing. However, these wall members 38 are spaced apart from each other by a distance larger than the widthwise dimensions of the inner webbing 14 and the outer webbing 16 and project from the joint base 26, so that the wall members 38 will not interfere with these webbings under the normal condition.

A plate-like projection 40 is extended from a portion of the joint base 26 close to the rivet 30. This plate-like projection 40 is formed with a pair of slots 42 extended in the longitudinal direction of the inner webbing 14 whereby narrow width portions 44 between the side surfaces of the plate-like projection 40 and the slots 42.

Pins 46 for penetrating through the inner webbing 14 in a direction of the wall thickness thereof are wound round these narrow width portions 44 so as to connect the plate-like projection 40 to the inner webbing 14. However, these pins 46 allow the inner webbing 14 and the joint base 26 to move relative to each other by a value of stroke of the slots 42.

Furthermore, a dust cover 48 indicated by two-dot chain lines in FIG. 4 may be secured to this joint base 26.

Description will now be given of operation of the present embodiment. FIG. 1 shows a state where a door 20 is opened by an occupant who intends to enter the vehicle and a space for allowing the occupant to enter the vehicle is formed between the webbings 14, 16 and the seat 12.

If the occupant closes the door 20 upon being seated at the seat 12, then the inner webbing 14 and the outer webbing 16 can be automatically fastened about the occupant.

During normal running condition of the vehicle, as shown in FIG. 4, the lock bar 36 is separated from the slot 28 of the joint base 26 and the contact portion of the outer webbing 16, so that the outer webbing 16 can freely pass through the slot 28. In consequence, a shoulder restraining portion 16A and a lap restraining portion 16B of the outer webbing 16 can freely accommodate in length with each other, and a suitably fastened stae can be rendered to any one of occupants being different in physical build from one another. Additionally, even if the occupant changes his driving posture during normal running condition of the vehicle, length of the shoulder restraining portion 16A and the lap restraining portion 16B can be changed depending on the driving posture after its change.

If the vehicle falls into an emergency situation such as a collision, then the inertia lock mechanism of the retractor 18 is operated to instantaneously stop the unwinding of the inner webbing 14. Simultaneously with this, the occupant 24 is moved by an inertial force in a direction of the collision of the vehicle, whereby a tensional force of a great value is generated in the webbings 14 and 16. This tensional force causes the lock bar 36 to approach the slot 28, whereby the contact portion of the outer webbing 16 is clampingly locked between the joint base 26 and the lock bar 36. By this, the outer webbing 16 cannot move and pass through the slot 28, so that lengths of the shoulder restraining portion 16A and the lap restraining portion 16B of the outer webbing are made definite. As a result, the occupant 24 is reliably restrained and such a disadvantage can be avoided that the occupant 24 is sunk into the seat 12.

In the locked state as described above, the inner webbing 14 is connected to the joint base 26 by means of the pins 46, and hence, there is little possibility that the inner webbing 14 and the joint base 26 are moved relative to each other in the widthwise direction of the webbing. However, if a torsional force and the like are generated in the ring joint 10, then, in the contact portion of the inner webbing 14 contacting the lock bar 36, there is generated a force for moving the lock bar 36 in the axial direction, i.e., the widthwise direction of the inner webbing 14. However, in this embodiment, the lock bar 36 is prevented by the wall members 38 from moving in the axial direction thereof, whereby the lock bar 36 and the inner webbing 14 do not move relative to each other in the widthwise direction of the webbing. In consequence, the lock bar 36 does not fall off the joint base 26, whereby the occupant is maintained in a reliably restrained state, so that safety of the occupant can be improved.

In this embodiment, the pins 46 are adopted to extend between the plate-like projection 40 and the inner webbing 14. However, the pins may be replaced by sewing yarn or the like as connecting means.

As has been described hereinabove, in the ring joint for a seatbelt system according to the present invention, the joint base is provided thereon with the stoppers, whereby the lock member is restricted in its movement in the widthwise direction of the webbing, so that a possibility that the lock member falls off the joint base can be eliminated, thereby enabling to offer the advantage of improving safety of the occupant.

What is claimed is:

1. A ring joint for use in a seatbelt system for protecting an occupant in an emergency situation of a vehicle, the seatbelt system including an outer webbing connected to an inner webbing through said ring joint, said ring joint comprising:

a joint base of a plate type around which is wound the intermediate portion of the outer webbing;

a lock member supported by said joint base and engaged with the inner webbing for locking a contact portion of said outer webbing between said joint base and said lock member in an emergency situation of the vehicle; and stoppers projecting from said joint base for restricting the movement of said lock member in the widthwise direction of the inner and outer webbings; whereby, when locking is effected between said joint base and said lock member, said webbing and said lock member are prevented from moving relative to each other, said lock member is locked against dislodging from said joint base, and the occupant is maintained in a reliably restrained state.

2. A ring joint as set forth in claim 1, wherein said inner webbing is formed at an end portion thereof with a loop portion, into which said lock member is inserted.

3. A ring joint as set forth in claim 2, wherein said lock member has an axis disposed in the widthwise direction of said inner webbing.

4. A ring joint as set forth in claim 2, wherein opposite end portions of said lock member project in the widthwise direction of the webbing, and a resilient member made of a sheet spring secured to said joint base holds said projecting opposite end portions to separate said lock member from said joint base by a biasing force thereof.

5. A ring joint as set forth in claim 1, wherein said stoppers are a pair of wall members projecting from said joint base and integrally formed therewith, each of the wall members being opposed to an opposite end portion of said lock member and having an upper end face with a height less than that of the opposite end portion of said lock member, the height of the upper end face of each wall member being greater than the height of the opposite end portion of the lock member in the emergency situation of the vehicle.

6. A ring joint as set forth in claim 1, wherein said joint base is a base material coated thereon with a synthetic resin layer.

7. A ring joint as set forth in claim 6, wherein said stoppers are integrally formed on said synthetic resin layer.

8. A ring joint as set forth in claim 1, wherein said joint base is formed with a pair of slots parallel to each other for guiding the movement of said joint base in the longitudinal direction of said inner webbing.

9. A ring joint as set forth in claim 1, wherein said joint base is formed with a slot, the intermediate portion of said outer webbing being inserted through said slot and turned back, and further comprising resilient members supporting said lock member on said joint base such that said lock member is adapted to overcome the force of said resilient members and push against the turned back portion so as to prevent movement of said outer webbing in the longitudinal direction thereof in an emergency situation of the vehicle.

10. A ring joint as set forth in claim 1, wherein said joint base is formed with a plurality of projections at a portion of the joint base abutting the outer webbing, whereby a frictional force is increased between the outer webbing and the joint base in the emergency situation of the vehicle.

11. A ring joint interposed between the intermediate portion of an outer webbing secured at opposite ends thereof to a door and the forward end portion of an inner webbing whose one end is wound into a retractor provided at the substantially central portion of a vehicle to connect the inner and outer webbings to each other to thereby form a three-point type seatbelt system, said ring joint comprising:

a joint base of a plate type formed into a ring shape having a slot through which is inserted and turned back the intermediate portion of said outer webbing;

a lock bar disposed at one side of said joint base and mounted thereon with the outer webbing which has passed through the slot of said joint base from the other side;

a resilient member made of a sheet spring secured to said joint base and adapted to bias said lock bar to a position separated from a portion of said outer webbing in the slot, and, when a tensional force in said inner webbing increases in an emergency situation of the vehicle, to push said outer webbing against said joint base through said lock bar to lock the movement of said outer webbing; and a pair of stoppers projecting from said joint base and opposed to axially opposite end portions of said lock bar, said stoppers preventing the axial movement of said lock bar when said outer webbing is locked by said lock bar; whereby, in an emergency situation of the vehicle, said lock bar is prevented from falling off so as to secure the restrained state of the occupant.

12. A ring joint as set forth in claim 11, wherein said joint base is formed with a plurality of projections at a portion of the joint base abutting the outer webbing, whereby a frictional force is increased between the outer webbing and the joint base in the emergency situation of the vehicle.

* * * * *

UNITED STATES PATENT AND TRADEMARK OFFICE
CERTIFICATE OF CORRECTION

PATENT NO. : 4,518,173
DATED : May 21, 1985
INVENTOR(S) : Makoto YAMADA, et al

It is certified that error appears in the above-identified patent and that said Letters Patent is hereby corrected as shown below:

Item (73) Assignees, should read as follows:

(73) Assignees: Toyota Jidosha Kabushiki Kaisha, Toyota-shi Aichi; Kabushiki Kaisha Tokai-Rika-Denki-Seisakusho, Toyota, both of Japan.

Signed and Sealed this

Third Day of December 1985

[SEAL]

Attest:

DONALD J. QUIGG

Attesting Officer     Commissioner of Patents and Trademarks